United States Patent
Mujibiya

(10) Patent No.: US 10,628,955 B2
(45) Date of Patent: Apr. 21, 2020

(54) INFORMATION PROCESSING DEVICE, INFORMATION PROCESSING METHOD, AND PROGRAM FOR IDENTIFYING OBJECTS IN AN IMAGE

(71) Applicant: Rakuten, Inc., Tokyo (JP)

(72) Inventor: Adiyan Mujibiya, Tokyo (JP)

(73) Assignee: Rakuten, Inc., Tokyo (JP)

( * ) Notice: Subject to any disclaimer, the term of this patent is extended or adjusted under 35 U.S.C. 154(b) by 158 days.

(21) Appl. No.: 15/575,163

(22) PCT Filed: May 19, 2015

(86) PCT No.: PCT/JP2015/064295
§ 371 (c)(1),
(2) Date: Nov. 17, 2017

(87) PCT Pub. No.: WO2016/185557
PCT Pub. Date: Nov. 24, 2016

(65) Prior Publication Data
US 2018/0144494 A1 May 24, 2018

(51) Int. Cl.
*G06K 9/00* (2006.01)
*G06T 7/70* (2017.01)
(Continued)

(52) U.S. Cl.
CPC ............. *G06T 7/70* (2017.01); *G06F 3/0488* (2013.01); *G06F 3/04842* (2013.01);
(Continued)

(58) Field of Classification Search
CPC .. G06K 9/00; G06K 9/00442; G06K 9/00449; G06K 9/00456; G06K 9/00463;
(Continued)

(56) References Cited

U.S. PATENT DOCUMENTS 8,745,671 B2 * 6/2014 Adrick ............... H04N 21/4314
725/62
9,832,441 B2 * 11/2017 Osman ............... H04N 21/4126
(Continued)

FOREIGN PATENT DOCUMENTS

JP 2008-015702 A 1/2008
JP 2010-262601 A 11/2010

OTHER PUBLICATIONS

Adiyan Mujibiya, "GlassNage: Layout Recognition for Dynamic Content Retrieval in Multi-Section Digital Signage", WISS2014 Yokoshu, Nov. 26, 2014, Internet, <URL:http://www.wiss.org/WISS2014Proceedings/demo/074.pdf>.
(Continued)

*Primary Examiner* — Eric Rush
(74) *Attorney, Agent, or Firm* — Sughrue Mion, PLLC

(57) ABSTRACT

For example, a captured image including an image to be processed is received. In the image to be processed, various items are separately displayed in a plurality of areas. Subsequently, a partition pattern that partitions the image to be processed, which is included in the received captured image, into a plurality of areas is extracted. An object to be processed is recognized by comparing the extracted partition pattern with one or more partition patterns prestored in a storage unit and then identifying a partition pattern corresponding to the partition pattern extracted from the image to be processed. This makes it possible to recognize an object to be processed under a relatively light processing load.

9 Claims, 9 Drawing Sheets

(51) Int. Cl.

| | | |
|---|---|---|
| *H04N 5/232* | (2006.01) | |
| *G06F 3/0488* | (2013.01) | |
| *G06K 9/20* | (2006.01) | |
| *G06K 9/32* | (2006.01) | |
| *G06F 16/48* | (2019.01) | |
| *H04N 21/4722* | (2011.01) | |
| *H04N 21/478* | (2011.01) | |
| *G06F 16/432* | (2019.01) | |
| *H04N 21/414* | (2011.01) | |
| *G06F 3/0484* | (2013.01) | |
| *G06F 3/147* | (2006.01) | |
| *G06K 9/46* | (2006.01) | |

(52) U.S. Cl.
CPC ......... *G06F 3/04886* (2013.01); *G06F 3/147* (2013.01); *G06F 16/434* (2019.01); *G06F 16/489* (2019.01); *G06K 9/00463* (2013.01); *G06K 9/2081* (2013.01); *G06K 9/325* (2013.01); *G06K 9/4604* (2013.01); *H04N 5/232* (2013.01); *H04N 21/41415* (2013.01); *H04N 21/4722* (2013.01); *H04N 21/47815* (2013.01); *G06F 2203/0384* (2013.01)

(58) Field of Classification Search
CPC ........... G06K 9/00469; G06K 9/00476; G06K 9/00483; G06K 9/2054; G06K 9/2081; G06K 9/3233; G06K 9/3241; G06K 9/325; G06K 9/34; G06K 9/4604; G06K 9/4633; G06K 9/4638; G06K 9/468; G06K 2209/03; G06T 7/10; G06T 7/12; G06T 7/13; G06T 7/181; G06T 7/70; G06T 7/73; G06T 7/74; G06T 7/75; G06T 2207/20021; G06T 2207/30176; G06F 3/048; G06F 3/0481; G06F 3/04842; G06F 3/0488; G06F 3/04886; G06F 3/14; G06F 3/147; G06F 16/20; G06F 16/40; G06F 16/434; G06F 16/48; G06F 16/483; G06F 16/487; G06F 16/489; G06F 16/50; G06F 16/532; G06F 16/58; G06F 16/583; G06F 16/5854; G06F 2203/0384; H04N 5/232; H04N 21/4126; H04N 21/41415; H04N 21/4722; H04N 21/4725; H04N 21/4728; H04N 21/47815

USPC ........ 382/100–103, 112–114, 137, 143, 170, 382/171, 173–181, 190, 199, 202, 203, 382/209, 217, 218, 224, 229, 282; 358/453, 462, 464; 715/204, 210, 715/224–228, 234, 240, 243–247, 764, 715/765

See application file for complete search history.

(56) References Cited

U.S. PATENT DOCUMENTS

| | | | |
|---|---|---|---|
| 9,852,135 B1* | 12/2017 | McHugh | G06F 16/40 |
| 9,900,515 B2* | 2/2018 | Kim | G06K 9/00221 |
| 2011/0246495 A1* | 10/2011 | Mallinson | H04N 21/4788 |
| | | | 707/758 |
| 2012/0017236 A1* | 1/2012 | Stafford | H04N 21/4223 |
| | | | 725/32 |
| 2012/0070085 A1* | 3/2012 | Arn | H04N 21/482 |
| | | | 382/173 |
| 2014/0193038 A1* | 7/2014 | Kasahara | G06K 9/228 |
| | | | 382/103 |
| 2014/0282743 A1* | 9/2014 | Howard | H04N 21/47815 |
| | | | 725/60 |
| 2015/0052479 A1* | 2/2015 | Ooi | G06F 3/04815 |
| | | | 715/810 |
| 2015/0286598 A1* | 10/2015 | Murakami | H04N 21/4307 |
| | | | 710/113 |
| 2015/0363076 A1* | 12/2015 | Komatsu | G06K 9/00671 |
| | | | 715/765 |
| 2016/0295036 A1* | 10/2016 | Momoki | G06K 9/00463 |

OTHER PUBLICATIONS

International Search Report for PCT/JP2015/064295, dated Aug. 11, 2015.

* cited by examiner

FIG. 5A

DISPLAY DEVICE MANAGEMENT DB 51

| DISPLAY DEVICE ID | INSTALLATION LOCATION INFORMATION | |
|---|---|---|
| APPLICABLE SCHEDULE | | |
| SCHEDULE NO. | LAYOUT ID | PERIOD INFORMATION |
| 001 | LID1 | . . . . |
| 006 | LID4 | . . . . |
| . | . | . |
| . | . | . |
| . | . | . |
| DEVICE ATTRIBUTE INFORMATION | | |

FIG. 5B

SCHEDULE DB 52

| SCHEDULE NO. | SCHEDULE DATA | LAYOUT ID | INFORMATION RETRIEVAL DATA | . . . |
|---|---|---|---|---|
| 001 | . . . | LID1 | | |
| 002 | . . . | LID5 | | |
| . | . | . | | |
| . | . | . | | |
| . | . | . | | |

· SECTION ID
· ASSIGNMENT INFORMATION (CORRESPONDING TO TIME STAMP)

INFORMATION PROCESSING DEVICE, INFORMATION PROCESSING METHOD, AND PROGRAM FOR IDENTIFYING OBJECTS IN AN IMAGE

CROSS REFERENCE TO RELATED APPLICATIONS

This application is a National Stage of International Application No. PCT/JP2015/064295 filed May 19, 2015, the contents of all of which are incorporated herein by reference in their entirety.

TECHNICAL FIELD

The present invention relates to an information processing device, an information processing method, and a program. For example, the invention relates to techniques for identifying an object to be processed in a captured image.

CITATION LIST

Patent Literature

Patent Literature 1: JP 2010-262601 A

BACKGROUND ART

Techniques are known for analyzing a captured image to recognize a captured object included in the captured image.

For example, Patent Literature 1 discloses a pattern recognition system that calculates a feature value from a captured image, compares the calculated feature value with a prestored feature value of a predetermined object, and determines whether a captured object is the predetermined object.

SUMMARY OF INVENTION

Technical Problem

However, when there are many kinds of objects to be identified using a pattern recognition system such as described above, it is necessary and burdensome to obtain a feature value of each of all objects in advance. Moreover, an additional processing load is placed by comparing a feature value of a captured object with the feature values of all kinds of objects.

Therefore, it is an object of the present invention to identify a captured object under a reduced processing load.

Solution to Problem

An information processing device according to the present invention includes a captured image receiver, a partition pattern extractor, and an object recognizer. The captured image receiver receives input of a captured image. The partition pattern extractor extracts a partition pattern that demarcates a plurality of areas in the captured image received by the captured image receiver. By referring to a storage unit that prestores one or more partition patterns in association with objects to be processed, the object recognizer recognizes an object to be processed corresponding to the partition pattern extracted from the captured image.

By extracting a partition pattern on the captured image and then comparing this with the stored partition patterns, an object to be processed that is included in the captured image can be identified.

It is possible that the above-described information processing device further includes a selection operation recognizer, a request sender, and an information output controller. The selection operation recognizer recognizes a selected area on which a selection operation has been performed, among a plurality of areas demarcated by a partition pattern, in the object to be processed that is identified by the object recognizer. The request sender sends an information retrieval request to an external device. The information retrieval request includes at least selection operation information indicating the selected area recognized by the selection operation recognizer. The information output controller obtains information sent in response to the information retrieval request and performs an information output control based on the obtained information.

When a certain area is selected by a user operation in each area of an image of the recognized object to be processed, the information processing device sends an information retrieval request with information indicating the selected area to the external device. This enables the external device (e.g., an information server) to recognize that the information processing device is requesting information related to what is displayed in the selected area.

In the above-described information processing device, the following is possible. An image of the object to be processed is an image in which a display item is managed in association with each of a plurality of areas demarcated by a partition pattern in advance. The information retrieval request is for requesting retrieval of related information about a display item associated with an area indicated by selection operation information.

When the object to be processed has a plurality of areas demarcated by a predetermined partition pattern and is displaying some information, the external device (e.g., the information server), which manages display items in association with the areas in advance, can understand a display item on the basis of the information retrieval request including the selection operation information, and directly or indirectly provide information related to the display item.

In the above-described information processing device, the following is possible. An image of the object to be processed is an image in which a display item is managed in association with time information for each of a plurality of areas demarcated by a partition pattern. The request sender sends the information retrieval request including date and time information at which the captured image receiver received input of a captured image.

When causing the display item in each area to change, the external device (e.g., the information server), which manages display items in association with the areas and timing information in advance, can understand an display item being displayed at the date and time when the user performed the operation, on the basis of the information retrieval request including area selection operation information and the date and time information, and directly or indirectly provide information related to the display item.

In the above-described information processing device, it is desirable that the partition pattern extractor extract a partition pattern partitioned by straight lines in a captured image.

That is, the information processing device recognizes a partition pattern on the assumption that the partition pattern is partitioned by straight lines.

In the above-described information processing device, the following is possible. An image to be processed by the partition pattern extractor is an image of a display device on which images are displayed in all or some of a plurality of areas demarcated by a partition pattern. The images displayed on the display device include a moving image.

That is, the image to be processed is an image of the display device that is displaying images including a moving image in all or some of the areas.

An information processing method according to the present invention includes the following steps. Input of a captured image is received. A partition pattern that demarcates a plurality of areas in the received captured image is extracted. An object to be processed corresponding to the partition pattern extracted from the captured image is recognized by referring to a storage unit that prestores one or more partition patterns in association with objects to be processed.

By extracting a partition pattern on the captured image and then comparing this with the stored partition patterns, an object to be processed that is included in the captured image can be identified.

A program according to the present invention is a program for causing an information processing device to perform each step of the above information processing method.

Advantageous Effects of Invention

The present invention makes it possible to recognize an object to be processed that is included in a captured image without performing a relatively computationally-intensive image analysis of a still image, a moving image, or the like. Thus, the processing load placed by recognizing the object to be processed can be reduced.

BRIEF DESCRIPTION OF DRAWINGS

FIGS. 5A and 5B are diagrams each illustrating a database structure according to the embodiment.

DESCRIPTION OF EMBODIMENTS

Figure 1A:
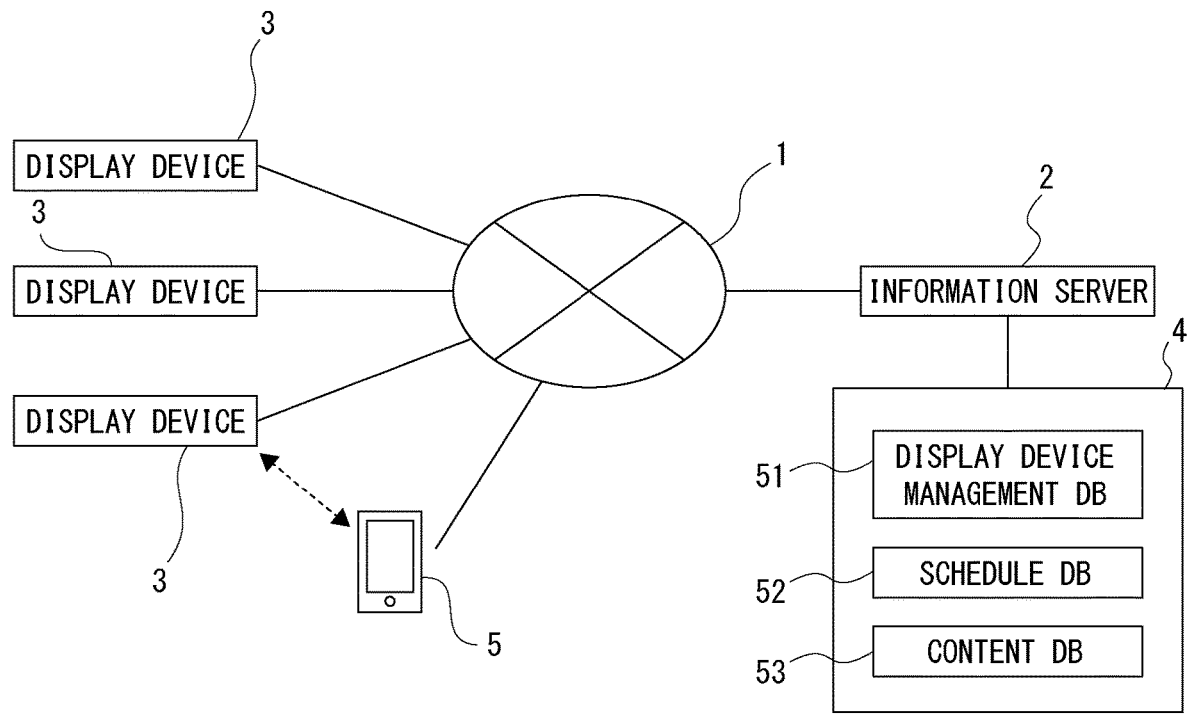
FIGS. 1A and 1B are diagrams each illustrating a system configuration according to an embodiment of the present invention.

An embodiment will be described in the following order.
1. System Configuration
2. Configuration of User Terminal
3. Database
4. Example System Process
5. Summary and Modifications
6. Program and Storage Medium 1. System Configuration FIG. 1A shows a system configuration according to an embodiment. The system includes an information server 2, display devices 3, and a user terminal 5, which are capable of communicating with each other over a network 1. The information server 2 is capable of accessing various databases shown as a database section 4. Hereinafter, "database" is referred to as "DB".

This embodiment is described assuming that the user terminal 5 in this system is a device corresponding to an information processing device according to the claims of the present invention.

There are various possible example configurations for the network 1. The examples can include not only the Internet but also an intranet, an extranet, a local area network (LAN), a community antenna television (CATV) network, a virtual private network, a telephone network, a mobile communication network, and a satellite communication network.

There are also various possible examples for a transmission medium constituting all or part of the network 1. The examples can include not only wires such as an Institute of Electrical and Electronics Engineers (IEEE) 1394, a universal serial bus (USB), a power-line communication, and a telephone line; but also wireless such as infrared light like infrared data association (IrDA), Bluetooth®, 802.11 wireless, a mobile telephone network, a satellite channel, and a digital terrestrial network.

This embodiment assumes a system as what is called digital signage that disseminates information using a network-connected display installed in a public space, such as outdoors, in front of a store, in a square, or in a transportation system.

That is, each display device 3 is a display device installed in a public space and used for digital signage. For example, a large-sized flat display or a projector is often used as the display device 3.

The information server 2 is a server for managing operations of the system as digital signage.

The information server 2 performs display content time schedule management and display content provision for each display device 3 and causes the display device 3 to actually disseminate information.

The DB section 4 used by the information server 2 includes, for example, a display device management DB 51, a schedule DB 52, and a content DB 53.

The display device management DB 51 stores, for example, information specifying the attributes of each display device 3 and a display schedule for the display device 3.

The schedule DB 52 manages setting information for various display schedules.

The display device management DB 51 and the schedule DB 52 will be described in detail later.

The content DB 53 stores various types of content (moving images, still images, and text data) to be displayed using digital signage.

The digital signage disseminates a wide variety of information items, such as various advertisements, guides, weather forecasts, news, time, and image clips. The information server 2 can cause the display device 3 to display, for example, content stored in the content DB 53.

The display device 3 can select and display not only content stored in the content DB 53 but also, for example, a web page image specified by a predetermined uniform resource locator (URL), a moving image link, or a broadcast image.

For normal digital signage, the display device 3 simply disseminates information. In contrast, general users can more actively obtain information using their terminals (user terminals 5) from the system according to this embodiment.

Possible examples of the user terminals 5 used by general users can include not only mobile information terminals, such as smartphones, tablet devices, mobile phones, and portable personal computers, but also wearable information terminals, such as smartglasses, head-mounted displays, and smartwatches.

In this embodiment, it is desirable that each user terminal 5 be an information processing device with a hardware-based imaging function. However, the user terminal 5 only needs to import captured image data. For example, the user terminal 5 may import captured image data captured by an external imaging device (camera).

As will be described in detail later, a user captures an image of the display device 3 using the user terminal 5. The user then selects information (e.g., content) displayed on the display device 3 shown in the captured image to obtain information related to the selected information or information for retrieving the related information from the information server 2.

In some cases, a near-field communication system, such as Bluetooth® or infrared communication, enables the user terminal 5 and the display device 3 to communicate with each other.

Figure 1B:
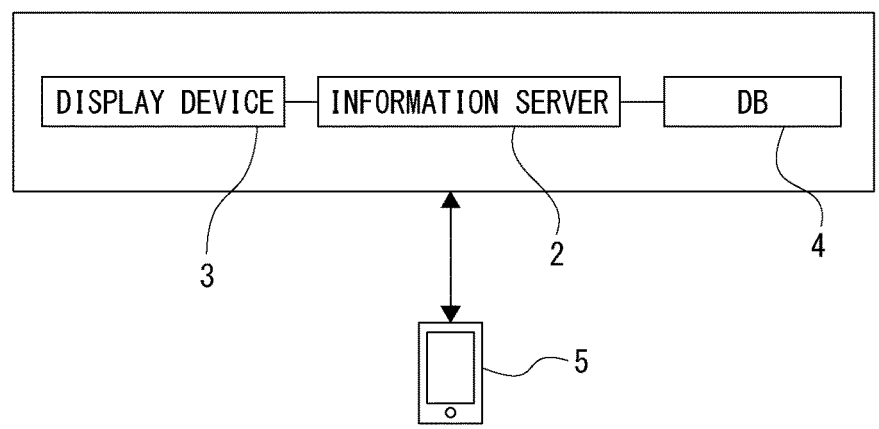

FIG. 1A shows a system configuration as an example where the information server 2 manages a plurality of display devices 3. Alternatively, as shown in FIG. 1B, one information server may manage one display device 3. In this case, the display device 3 and the information server 2 may be connected to each other via a public network or may be locally connected to each other.

What the display device 3 in this system display is now described with reference to FIGS. 2A, 2B, and 2C.

Figure 2A:
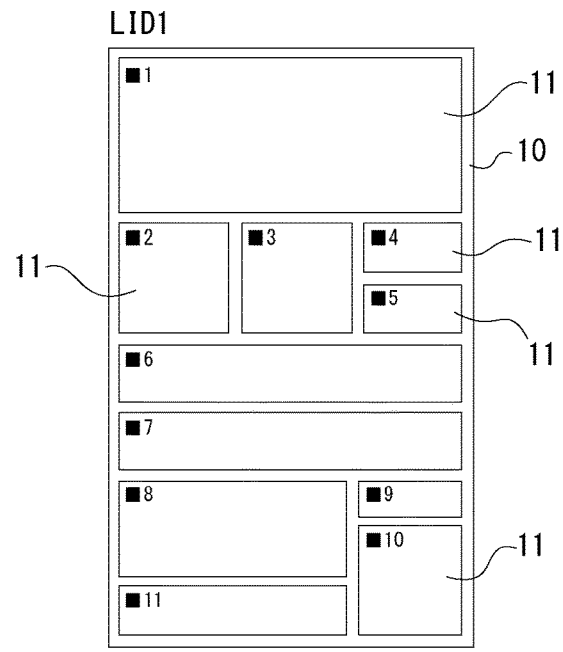
FIGS. 2A and 2B are diagrams each illustrating a partition pattern according to the embodiment.
Figure 2B:
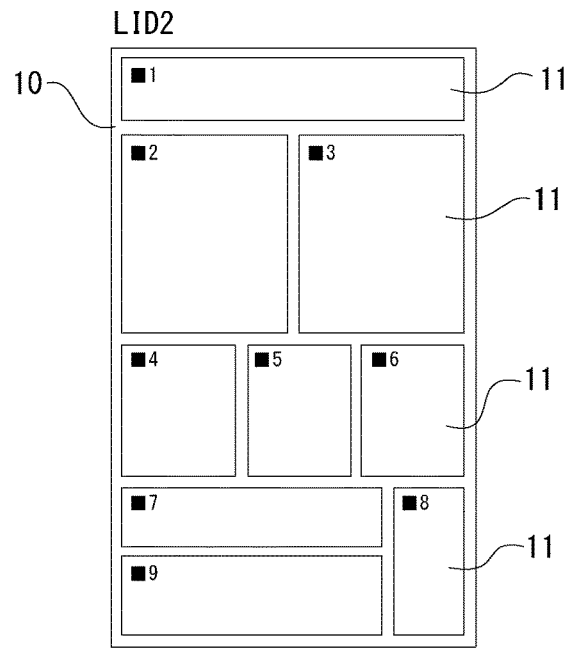

FIGS. 2A and 2B each show an example area layout for the display screen of the display device 3.

The information server 2 causes the display device 3 to display various items to be displayed as digital signage on its screen, for example, using an area layout shown in FIG. 2A or 2B.

For example, the area layout of FIG. 2A defines a partition pattern set as a frame 10 that divides a screen area into eleven areas 11.

The area layout of FIG. 2B defines a partition pattern set as a frame 10 that divides a screen area into nine areas 11.

In these examples, each frame 10 is defined using only straight line segments.

The information server 2 manages such various area layouts as these, for example, by assigning a layout identification (ID) to each of the area layouts. For purposes of explanation, assume that the layout ID of FIG. 2A and the layout ID of FIG. 2B are respectively "LID1" and "LID2".

It should be noted that the information server 2 only needs to manage at least one area layout. However, for purposes of explanation, assume that the information server 2 manages a plurality of area layouts so that the area layouts can be identified by their layout IDs.

The information server 2 causes each of one or more display devices 3 to display information on the basis of a corresponding specified area layout.

Figure 2C:
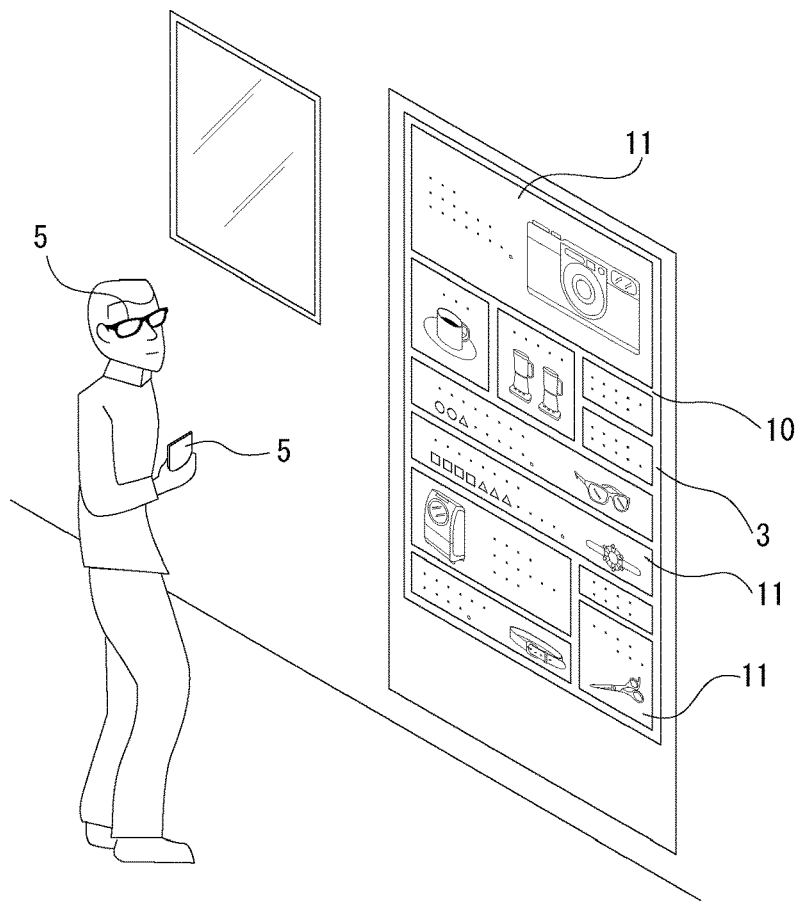
FIG. 2C is a diagram illustrating a display device according to the embodiment.

FIG. 2C shows an example where a certain display device 3 installed in a public place is displaying information using the area layout identified by the layout ID "LID1".

On the screen of the display device 3, users can see information items displayed, for example, in eleven demarcated areas 11.

In this embodiment, each user can obtain not only information displayed by the display device 3 but also more various related information using his or her user terminal 5, for example, a smartphone or smartglasses such as shown in the figure.

Figure 3:
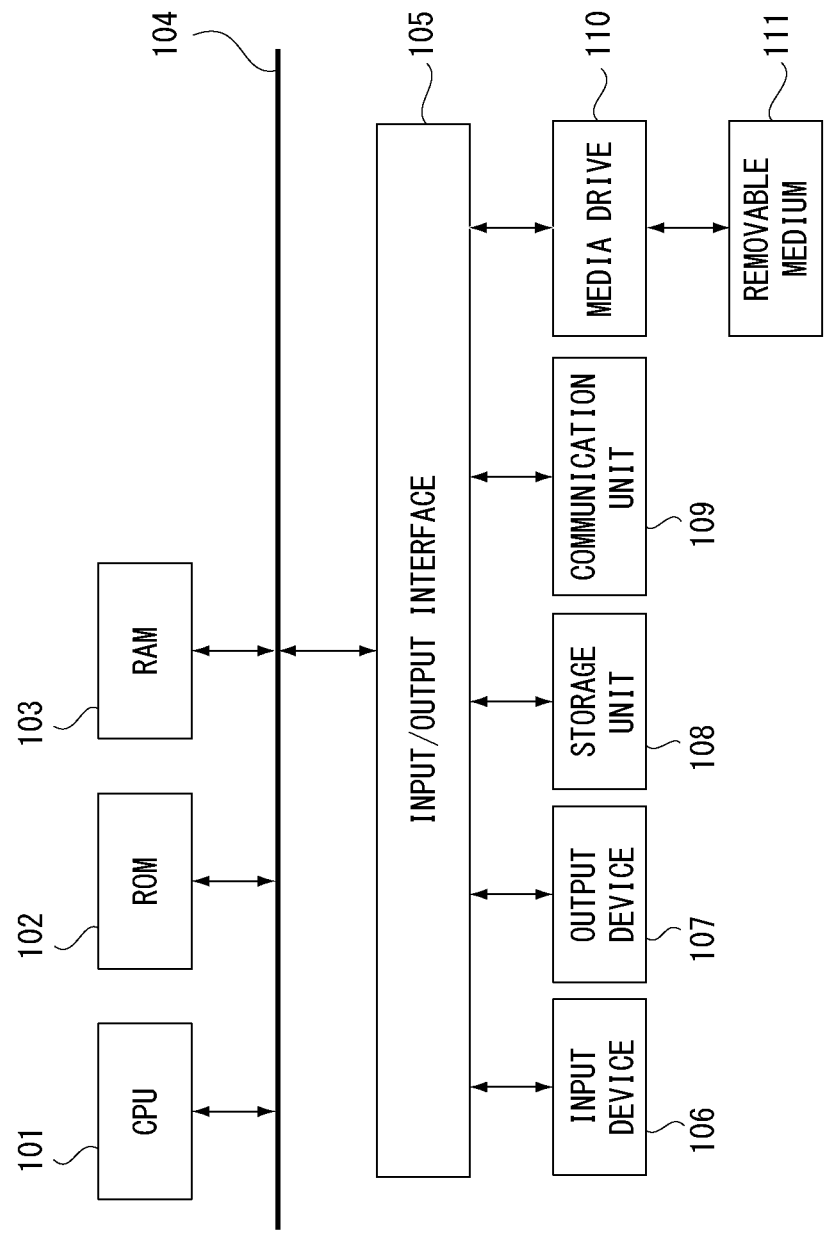
FIG. 3 is a block diagram of a configuration of an information processing device and the display device according to the embodiment.

FIG. 3 shows a hardware configuration of an information processing device on which the information server 2 and the display device 3 shown in FIG. 1 are each implemented. The information server 2 and the display device 3 can be implemented as a computer device such as shown in FIG. 3. The computer device is capable of performing information processing and information communications.

In FIG. 3, a central processing unit (CPU) 101 of the computer device performs various processes in accordance with programs stored in a read only memory (ROM) 102 or programs loaded from a storage unit 108 into a random access memory (RAM) 103. The RAM 103 also stores data required for the CPU 101 to perform the various processes and other data as appropriate.

The CPU 101, the ROM 102, and the RAM 103 are connected to each other via a bus 104. An input/output interface 105 is also connected to this bus 104.

An input unit 106, an output unit 107, the storage unit 108, and a communication unit 109 are connected to the input/output interface 105. The input device 106 includes, for example, a keyboard, a mouse, and a touch screen. The output device 107 includes, for example, a speaker and a display, such as a liquid crystal display (LCD), a cathode ray tube (CRT), or an organic electroluminescent (EL) panel. The storage unit 108 includes, for example, hard disk drives (HDDs) and flash memory devices. The communication unit 109 performs, for example, communication processing, inter-device communications, and near-field communications over the network 1.

A media drive 110 is also connected to the input/output interface 105 as needed. A removable medium 111, such as a magnetic disk, an optical disk, a magneto-optical disk, or a semiconductor memory, is mounted in the media drive 110 as appropriate, and information is then written to and read from the removable medium 111.

This computer device is capable of uploading and downloading data and programs through communications by the communication unit 109, and is capable of exchanging data and programs via the removable medium 111.

The CPU 101, which performs processing operations in accordance with various programs, performs information processing and communications required for the information server 2 or the display device 3.

An information processing device constituting the information server 2 or the display device 3 is not limited to a single computer device as shown in FIG. 3, and may include a plurality of computer devices integrated into a system. The plurality of computer devices may be integrated into a system, for example, via a LAN, or may be located remote from each other, for example, over a VPN using the Internet.

2. Configuration of User Terminal

Figure 4A:
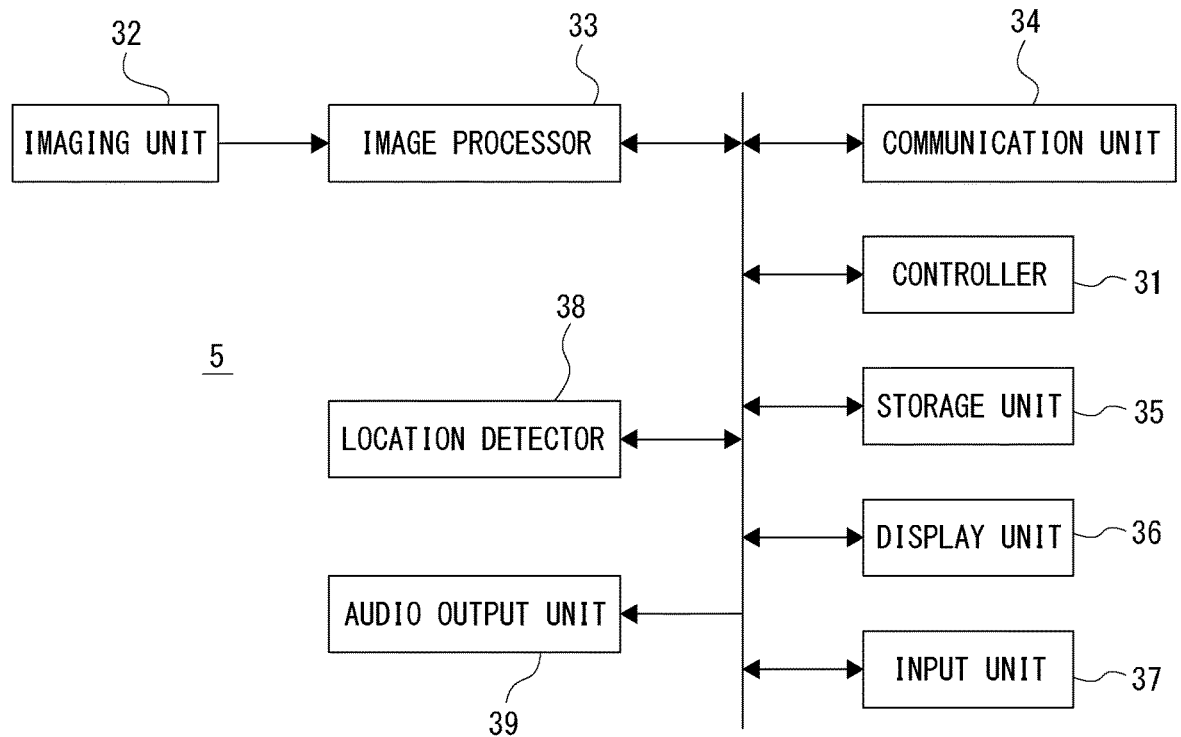
FIGS. 4A and 4B are block diagrams of a configuration of a user terminal according to the embodiment.

FIG. 4A shows an example configuration of the user terminal 5. The user terminal 5 includes a controller 31, an imaging unit 32, an image processor 33, a communication unit 34, a storage unit 35, a display unit 36, an input unit 37, a location detector 38, and an audio output unit 39.

The controller 31 shows the central control functional unit of the user terminal 5. For example, the controller 31 includes a microcomputer with a CPU, a ROM, and a RAM. The controller 31 controls each unit and performs necessary processing in accordance with an operating system (OS) and application programs.

The imaging unit 32 receives subject light entering through a lens system (not shown) using an imager, which includes a charge coupled device (CCD) sensor, a complementary metal oxide semiconductor (CMOS) sensor, or the like, and outputs a corresponding received light signal. Subsequently, the imaging unit 32 performs correlated double sampling (CDS) for the received light signal, further performs analog-to-digital (A/D) conversion of the signal, and then outputs an imaging signal as digital data to the image processor 33.

The image processor 33 performs, for example, image processing such as white balance and gamma correction, image enhancement, resolution conversion, display signal generation, and encoding (codec) for recording/communication, and then outputs image data (a moving image or a still image).

The image data output from the image processor 33 is displayed what is called in a live view (as a moving image for monitoring a subject) on the display unit 36 or stored as a still image or a moving image in the storage unit 35. The image data stored as a still image or a moving image in the storage unit 35 may be reproduced and displayed on the display unit 36.

The communication unit 34 performs various communications with an external device. For example, the communication unit 34 acts as a network interface unit that communicates with the information server 2 over the network 1. Provided with the above near-field communication function, the communication unit 34 functions as a transmitter/receiver for near-field communication.

The storage unit 35 is, for example, a volatile or nonvolatile memory that stores various types of information. The storage unit 35 may be a record/playback unit using a semiconductor memory, such as what is called a dynamic random access memory (DRAM), a static random access memory (SRAM), or a flash memory. Alternatively, the storage unit 35 may be a HDD. Alternatively, the storage unit 35 may be a record/playback unit for a portable storage medium, such as a memory card or an optical disk, For example, application programs, downloaded data, cached data, captured image data, and various types of data used by the user terminal 5 are stored in and read from the storage unit 35 under control by a controller 31.

The display unit 36 is the display of the user terminal 5, including a LCD or an organic EL panel. The controller 31 causes the display unit 36 to display various types of information in response to user operations.

The input unit 37 shows a unit used for a user to input operations. The input unit 37 is, for example, operation switches, a keyboard, or a touch screen provided on a display unit 36. The input unit 37 allows the user to perform various operations.

The input unit 37 may recognize, for example, the user's gesture detected by analyzing image data captured by the imaging unit 32 as an operation performed by the user.

The location detector 38 detects the location of the user terminal 5. The location detector 38 can include, for example, a global positioning system (GPS) receiver and a decoder for received location information. The controller 31 can recognize the current location by information obtained from the location detector 38.

The audio output unit 39 has, for example, an audio processing circuit for outputting audio such as various kinds of content audio and telephone conversation voices, an audio signal amplifier circuit, and a speaker or a headphone jack.

Figure 4B:
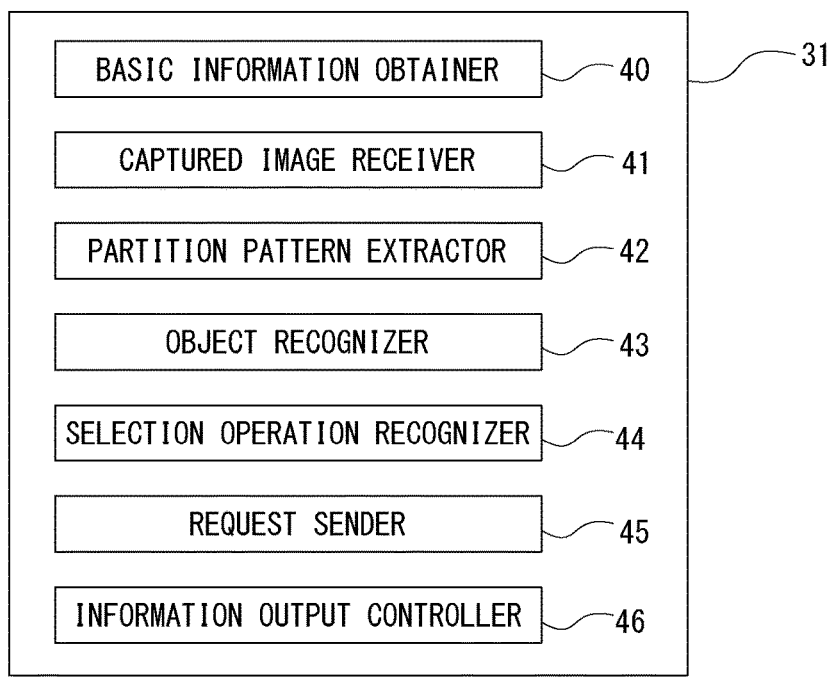

When being launched on this user terminal 5, an application program for using the digital signage shown in FIG. 1 provides the controller 31 with functions shown in FIG. 4B: a basic information obtainer 40, a captured image receiver 41, a partition pattern extractor 42, an object recognizer 43, a selection operation recognizer 44, a request sender 45, and an information output controller 46.

Here, assume that the above functions are implemented in software (the application program) executed by the controller 31. However, all or some of these functions may be implemented in hardware.

Each function implemented in software need not be implemented in a separate program. The processes of a plurality of functions may be performed by one program. Alternatively, one function may be implemented by cooperation between a plurality of program modules.

The basic information obtainer 40 performs a process for obtaining basic information for using the digital signage system one after another from the information server 2 and for storing the basic information in the storage unit 35. Specifically, the basic information obtainer 40 obtains various area layouts and basic information about each display device 3.

This basic information includes, for example, the display device ID of the display device 3, information about where the display device 3 is installed, and information about area layouts (layout IDs) used for the display device 3 to display on its screen.

The basic information also includes actual partition pattern information corresponding to each layout ID. The partition pattern information includes, for example, information about the shape of a frame 10 such as illustrated in FIGS. 2A and 2B (i.e., the shape of an area layout), and section IDs that are identifiers of corresponding areas 11.

The captured image receiver 41 performs a process for receiving input a captured image. Specifically, the captured image retriever 41 identifies a captured image obtained by the imaging unit 32 and the image processor 33 in response to an operation performed by the user as image data from which to extract a partition pattern. For example, when the user captures a still image, the captured image retriever 41 selects the still image data as image data from which to extract a partition pattern. Alternatively, even when the user does not capture a still image (import still image data in response to a shutter operation), the captured image retriever 41 selects one or more pieces of frame image data as image data from which to extract a partition pattern in a live view state, that is, while images (successive frames as a moving image) are being obtained from the imager.

The partition pattern extractor 42 performs a process for extracting a partition pattern that demarcates a plurality of areas in the captured image received by the function of the captured image receiver 41. This can be said to be, for example, a process for determining the shapes of the frames 10 shown in FIGS. 2A and 2B.

For example, specifically, the partition pattern extractor 42 analyzes the captured image to extract linear portions. This can be done by extracting pixels of the same brightness arranged linearly and continuously with a certain line width. The shape of a partition pattern (frame 10) is thus extracted.

The object recognizer 43 performs a process for recognizing an object to be processed corresponding to the partition pattern extracted from the captured image by referring to information associating one or more partition patterns with objects to be processed.

The storage unit 35 stores the above basic information provided from the information server 2, and the basic information includes actual partition pattern information. The partition pattern information is information about the shapes (area layouts) of partition patterns actually used (or likely to be used) for display by the display device 3 in this digital signage system. For example, the partition pattern information includes one or more pieces of information about the shapes of the frames 10 shown in FIGS. 2A and 2B.

The object recognizer 43 compares this partition pattern information prestored in the storage unit 35 with information about the partition pattern extracted from the captured image. If it is determined that the extracted partition pattern is identical to one of the stored partition patterns, the object recognizer 43 recognizes the captured image as a captured image of the display device 3 in this signage system. That is, the object recognizer 43 recognizes the captured image as an image of a display device 3 to be processed by the application program for using the digital signage.

The selection operation recognizer 44 performs a process for recognizing a selected area on which the user has performed a selection operation, among a plurality of areas 11 demarcated by the frame 10, which is the partition pattern, in the object to be processed that is identified by the object recognizer 43, namely, in the image of the display device 3.

The captured image of the display device 3 includes items (e.g., moving images, still images, and text) displayed in the areas 11 of the display device 3. The user can see the items on the display unit 36 of the user terminal 5. Specifically, advertisements for products and stores, news, various guides, and other items appear in the captured image.

In this system, the user selects any one of those information items to see information related to the selected item on the user terminal 5. For example, when selecting an advertisement for a coffee shop displayed in a certain area 11 of the display device 3 from the captured image of the display device 3 displayed on the user terminal 5, the user can see information related to the advertisement for the coffee shop, such as photographs, a map, and a menu of the coffee shop, and other detailed information. This system provides such a service.

To achieve such a service, the selection operation recognizer 44 performs a process for recognizing a selection operation that the user has performed on the captured image displayed on the display unit 36.

The request sender 45 performs a process for sending an information retrieval request to the information server 2. The information retrieval request includes at least selection operation information indicating the selected area recognized by the selection operation recognizer 44. This sends a request for related information that the user needs in the above service. The information retrieval request is for requesting information related to a display item selected by the user, and thus includes information identifying the selected area 11 so that the information server 2 can identify what has been selected. Specifically, the information is a section ID set for each area 11. In this embodiment, the request sender 45 sends the information retrieval request further including the display device ID of the display device 3 being processed, the layout ID of the area layout corresponding to the partition pattern recognized in the captured image, and a time stamp.

The information output controller 46 obtains information sent from the information server 2 in response to the information retrieval request by the request sender 45, and then performs an information output control based on the obtained information. For example, the information server 2 sends the related information directly or indirectly. For example, when the information server 2 sends the related information itself, the information output controller 46 performs a process for causing the information to be displayed on the display unit 36, a process for causing audio to be output from the audio output unit 39, or a process for causing the information to be stored in storage unit 35. It is conceivable that the information server 2 sends, for example, a uniform resource locator (URL) specifying a web page as indirect information for displaying the related information. In that case, the information output controller 46 launches a browser and then causes the browser to display the web page specified by the URL on the display unit 36, to output audio of the web page, and to store necessary information.

3. Database

The following describes examples of the display device management DB 51 and the schedule DB 52 in the DB section 4 that the information server 2 accesses.

FIG. 5A is an example data structure for the display device management DB 51. As shown in the figure, the display device management DB 51 stores, for each display device, a display device ID, installation location information, an applicable schedule, device attribute information, and other information.

Each display device ID is an ID identifying the corresponding display device 3, which is a code unique to the display device 3.

As the installation location information, for example, the latitude and longitude of the place where the display device 3 is installed, the address of the place, a facility type, and a manager of the place are stored.

As the device attribute information, attributes of the display device 3, such as its model name, model number, manufacturer name, manufacture date, screen size, resolution, communication information, and other information required to operate this digital signage system are stored.

The applicable schedule indicates, for each period, a schedule used for display by the display device 3. At least one schedule is assigned to the display device 3.

A schedule number, a layout ID, period information are stored for one schedule. The schedule number is the number of a schedule stored in the schedule DB 52 to be described later. This schedule number indicates that one specific schedule was applied to the display device 3.

The layout ID is identification information of an area layout (partition pattern) that the schedule is using.

Assuming that the layout ID is stored with the corresponding schedule number in the schedule DB 52 as will be described later, this applicable schedule need not necessarily include the layout ID.

The period information is information about the period during which the schedule is applied to the display device 3. Information about a set period from a certain date to another date and a set period of certain hours of day is stored.

Assignment and the applicable period of each of these schedules can be freely set by a system administrator.

When one display device 3 displays always using one schedule, only the schedule number specifying the schedule needs to be stored as applicable schedule information.

FIG. 5A is an example data structure for the schedule DB 52. The schedule DB 52 stores information about one or more created schedules that can be applied to each display device 3.

A schedule number, schedule data, a layout ID, information retrieval data, and other information are stored for one schedule.

Each schedule number is a unique number assigned to the corresponding created schedule.

The layout ID is identification information of an area layout (partition pattern) used for the schedule.

The schedule data includes the details of an actual schedule.

The contents of a schedule and a screen used to create the schedule are now described with reference to FIG. 6.

Figure 6:
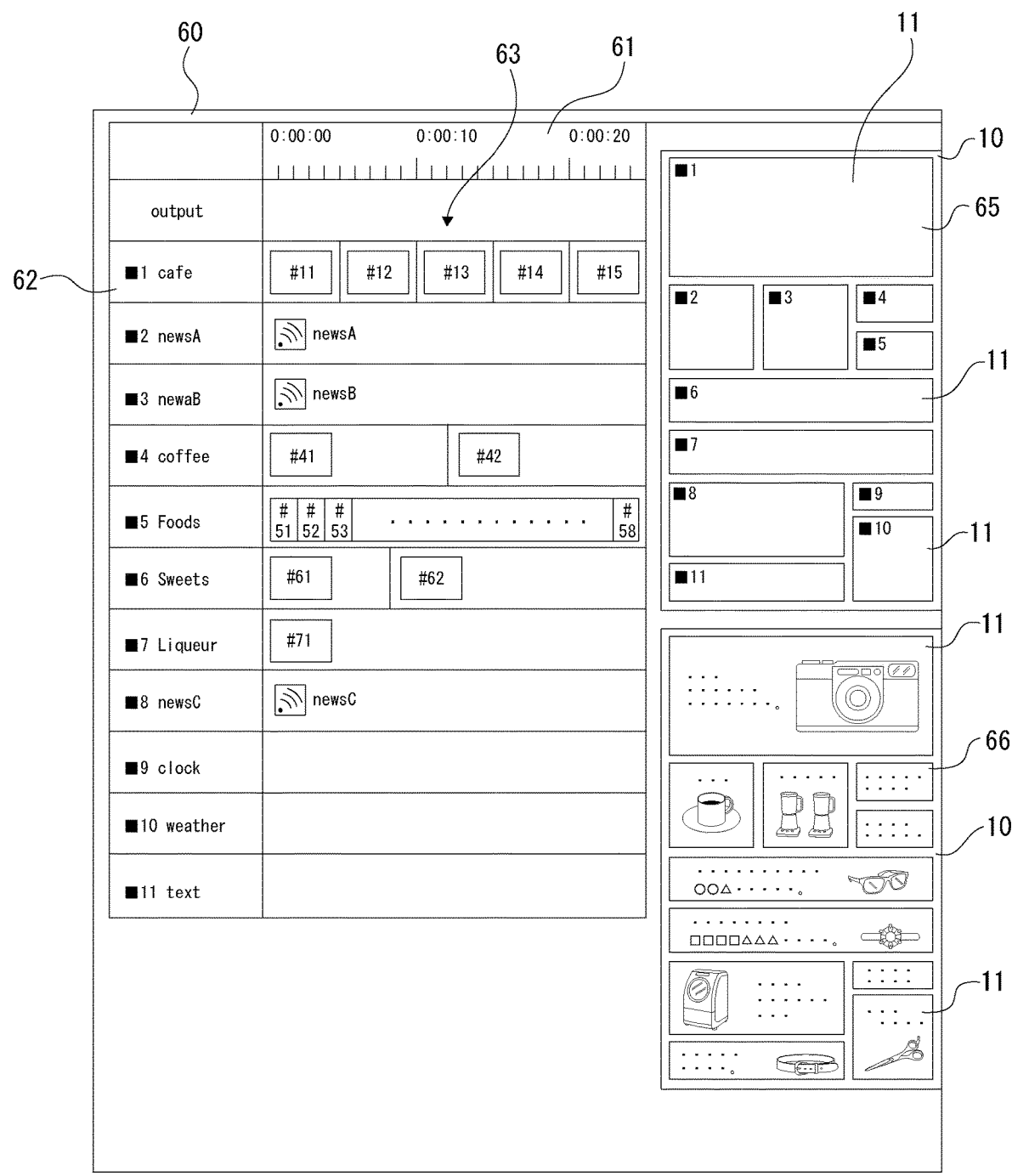
FIG. 6 is a diagram illustrating a scheduling tool according to the embodiment.

FIG. 6 shows an example screen of a creation/edit tool that the system administrator uses to create and edit a schedule.

This creation/edit screen 60 provides, for example, a timeline 61, display titles 62, assignment areas 63, a layout editing area 65, and a monitor area 66.

A partition pattern used for this schedule is displayed in the layout editing area 65. In this example, the partition pattern (layout ID=LID1) shown in FIG. 2A is used. Display of this layout editing area 65 allows the shape of the frame 10 of the partition pattern, which is to be used, and the areas 11 demarcated by the frame (the first to eleventh areas indicated by the numbers "1" to "11" therein in the figure) to be seen. The system administrator can change the position of the frame 10, for example, by performing an operation on the layout editing area 65 (an operation to drag the frame 10) to adjust the size of each area 11.

When this area layout is used, display item(s) are assigned to each of the first to eleventh areas 11. This display item is performed by specifying content and links along the timeline 61.

First, a display title 62 is set corresponding to each of the first to eleventh areas. This roughly reflects what is displayed in the corresponding area, for the convenience of the system administrator.

In the assignment area 63, each display title is assigned display item(s). In this example, the timeline 61 is set to a period of 25 seconds, and a 25-second-long display is scheduled to be repeated. Each display item is specified along this timeline 61.

For example, the first area titled "cafe" is assigned content items #11 to #15. This is an example of setting a slide show display that switches among the content items #11, #12, #13, #14, and #15 every five seconds.

The second area titled "newsA" is assigned information specifying a webcast called "newsA". This will enable a moving image of the linked webcast to be displayed in the second area.

As with these examples, the system administrator creates one schedule by specifying predetermined content, broadcast, or information sources for each area 11.

As the schedule data, the details of the schedule created as described above are stored in the schedule DB 52 of FIG. 5B. For example, section IDs are stored as identification information of the areas defined by the area layout (partition pattern) to be used. The section IDs are identification information of the above first to eleventh areas.

As the schedule data, pieces of assignment information are also stored corresponding one-to-one to the section IDs (the first area to eleventh areas). The assignment information is information about content and information sources as display items stored in association with the timeline 61 of FIG. 6. For example, the assignment information for the first area of FIG. 6 is information indicating settings such as "content item #11 at 0:00:00", "content item #12 at 0:00:05" . . . "content item #15 at 0:00:20".

As the schedule data, various items set as the schedule are further stored.

Based on such schedule data in the schedule DB 52, the information server 2 identifies what each display device 3 is scheduled to display and then causes each display device 3 to perform display operations as digital signage.

The information retrieval data stored in the schedule DB 52 includes information corresponding to the information retrieval request from the user terminal 5.

For example, the pointer or URL of related information corresponding to information sources, content, or other item assigned to each of the first to eleventh areas 11 is stored as the information retrieval data. The related information itself may be stored as the information retrieval data. Based on the information retrieval data, the information server 2 can send information corresponding to the information retrieval request from the user terminal 5.

The system administrator may set the information retrieval data, for example, using a creation screen such as shown in FIG. 6.

For example, on a creation screen such as shown in FIG. 6, an area for registering information retrieval data corresponding to a display item set in the assignment area 63 is provided or an information retrieval data setting screen appears when the display item is clicked, which allows the system administrator to freely set information retrieval data corresponding to each display item.

The above data structures for the schedule DB 52 and the display device management DB 51 are merely examples. There are possible data structures that integrate both the DBs into one DB, and the DB may include a wide variety of data. What should be stored in the DBs is at least data required for processes that will be described later.

The schedule DB 52 and the display device management DB 51 may be provided in any configuration accessible to the information server 2. For example, both the DB 51 and the DB 52 may be created in the storage unit that belongs to the same system as the information server 2. Alternatively, at least one of the DBs 51 and 52 may be provided, for example, in a separated or remote computer system. Of course, the DBs 51 and 52 need not be created in one device (e.g., one HDD). Each of the DBs 51 and 52 need not be configured as one DB. Each of the DBs 51 and 52 is merely an example where a storage unit for information relating to the processes according to the embodiment is illustrated as one DB format.

4. Example System Process

Figure 7:
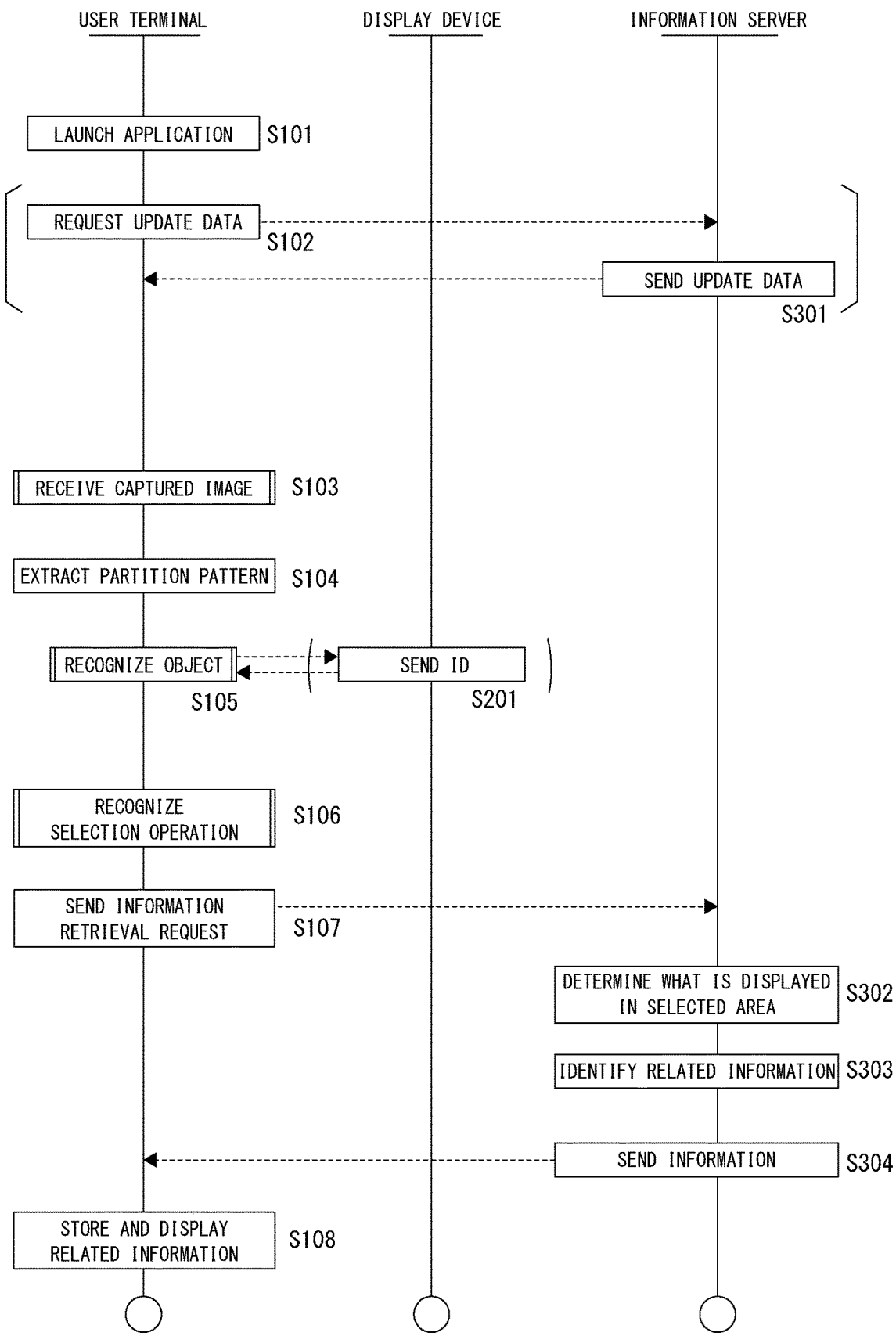
FIG. 7 is a flowchart of an example process according to the embodiment.

How the system according to this embodiment works is now described with reference to FIGS. 7 and 8. FIG. 7 shows how the user terminal 5, the display device 3, and the information server 2 perform a process.

As a precondition for this process, assume that the information server 2 sets area layouts and schedules relating to display operations performed by the display device 3 and causes the display device 3 to display in accordance with the schedule data. Thus, as shown in FIG. 2C, the display device 3 is displaying various kinds of information in each area 11 demarcated by a selected area layout (partition pattern).

Also assume that the user terminal 5 has the application program corresponding to the digital signage system installed on it and that the application program enables expansive information retrieval using the digital signage system, as described below, when being launched.

The storage unit 35 of the user terminal 5 stores various types of basic information together with the application program. As described above, examples of this basic information include the display device ID of each display device 3, information about where the display device 3 is installed, information about area layouts (layout IDs) used for the display device 3 to display on its screen, the actual partition pattern information corresponding to each layout ID, and section IDs that are identifiers of areas 11 demarcated by each area layout.

On the user terminal 5, the application program corresponding to the digital signage system is launched in Step S101.

The user terminal 5, on which the application program has been launched, requests an update on the above basic information from the information server 2 one after another as needed. In response to the update request, the information server 2 downloads update information to the user terminal 5 in Step S301.

Examples of update data include the display device ID of a newly installed display device 3, information about where the display device 3 is installed, and layout IDs and corresponding partition pattern information that have newly become available. These are added and stored as basic information in the storage unit 35 of the user terminal 5.

A user has an opportunity to actually use the digital signage system when looking at the display device 3 as shown in FIG. 2C. The user captures an image of the screen of the display device 3 using the user terminal 5 if finding an interest (e.g., an advertisement) among items displayed on the screen. In this case, any image will do at least as long as an image can be captured. The user terminal 5 may store captured image data as a still image, or may obtain one or more frames of captured image data as data to be processed. That is, the user only has to point the imaging unit 32 of the user terminal 5 at the display device 3.

Figure 8:
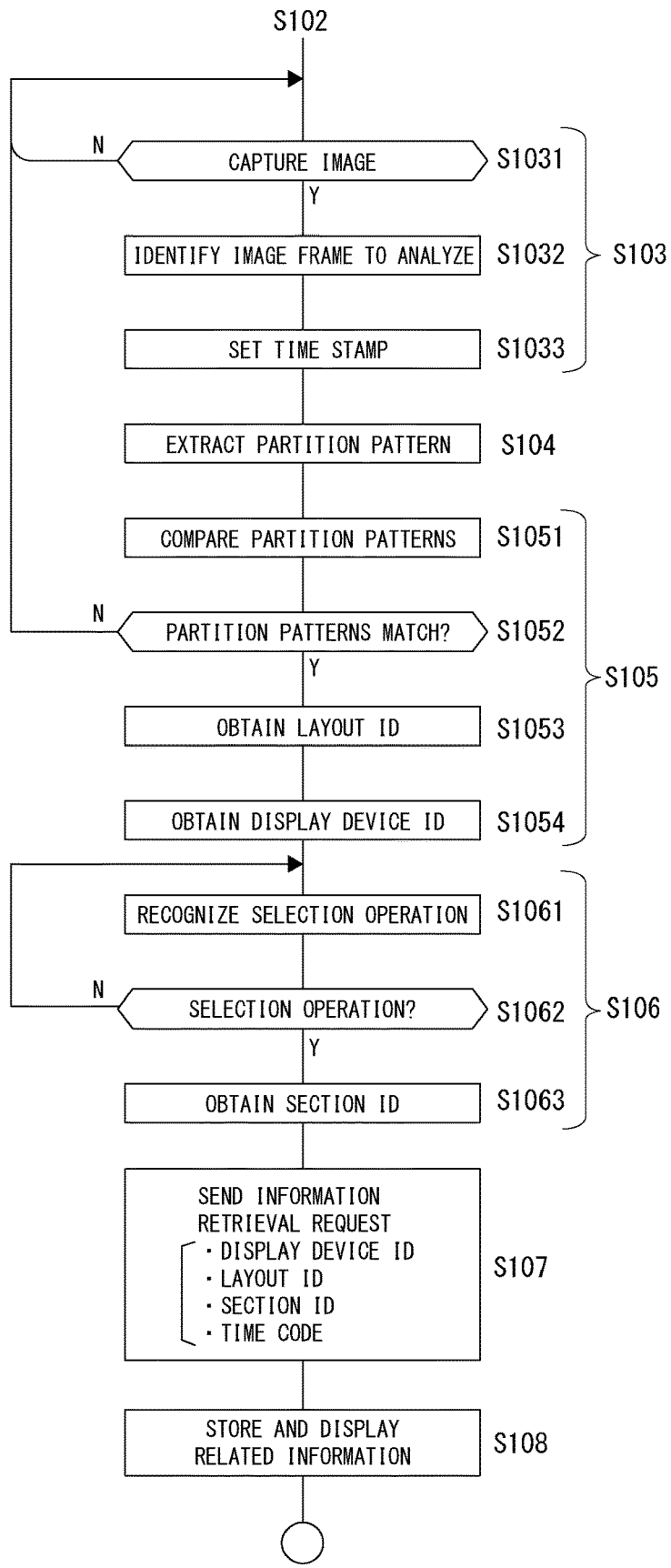
FIG. 8 is a flowchart of a process performed by the user terminal according to the embodiment.

FIG. 8 shows the process performed by the user terminal 5 in detail, and the process is described with reference to FIG. 8 as well as FIG. 7.

In Step S103 of FIG. 7, the controller 31 of the user terminal 5 performs a captured image reception process for receiving input of a captured image showing the screen of the display device 3. This is a process for obtaining, as an image from which to detect a partition pattern, a captured image produced when the user captures the entire screen of the display device 3 as a subject of the imaging unit 32.

Specifically, when captured image data starts to be obtained in Step S1031 of FIG. 8 in response to a capture operation performed by the user, the controller 31 identifies one or more piece of frame image data to analyze in Step S1032. When using the captured image imported as a still image to analyze, the controller 31 receives the frame image data as data to process. When using a moving image of the captured image, the controller 31 receives one or a predetermined number of pieces of frame image data as data to analyze.

The controller 31 also sets and temporarily stores date and time information (year, month, day, hour, minute, and second) at which the frame image data to analyze was captured as a time stamp in Step S1033.

After the above captured image reception process in Step S103, the controller 31 performs a partition pattern extraction process for extracting a partition pattern that demarcates a plurality of areas in the received captured image in Step S104 of FIG. 7. This is a process for analyzing the received frame image data to identify which part of the data is a frame 10 and for determining the shape of the frame 10. This process extracts apart constituting the frame 10 from the captured image and does not analyze the image to determine what is displayed in each area 11.

The controller 31 performs an object recognition process for recognizing an object to be processed corresponding to the partition pattern extracted from the captured image in Step S105.

The storage unit 35 store the patterns of one or more area layouts used in the digital signage system. This Step S105 is a process for comparing the shape of the frame extracted from the captured image with the shape of each area layout stored in the storage unit 35.

When the user actually captures an image of a display device 3 of the system, the extracted partition pattern is identical to the shape of a certain area layout (or substantially identical to the shape of a certain area layout with a recognition error). That is, if the recognized partition pattern matches an area layout, the controller 31 recognizes that the captured image data is a captured image of the screen of a display device 3 of this system and that the captured image data is an image suitable for a subsequent selection operation.

In this Step S105, the controller 31 first compares the shape of the frame extracted from the captured image with the shape of each area layout stored in the storage unit 35 in Step S1051, as shown in detail in FIG. 8.

In Step S1052, the process branches depending on whether there is any area layout that matches (is identical or substantially identical to) the frame extracted from the captured image.

If the frame extracted from the captured image does not match any area layout, the controller 31 causes the process to return to Step S1031. That is, the controller 31 determines that the frame image data identified as data to analysis is not a captured image of the screen of a display device 3, and reidentifies frame image data.

If the frame extracted from the captured image matches an area layout, the controller 31 causes the process to proceed to Step S1053, and then obtains the layout ID of the area layout from the basic information stored in the storage unit 35.

It should be noted that one or more pieces of frame image data identified, as data to be analyzed, in the above Step S1032 may not necessarily include the entire screen of the display device 3. As long as extraction and comparison of a partition pattern can be performed in Steps S104 and S1051, a frame including a captured image of any part of the screen of the display device 3 can be used. This is because, for example, it is enough that some feature points of a partition pattern are extracted from the captured frame image data so that an area layout that matches the partition pattern can be identified.

If one or more pieces of frame image data identified, as data to be analyzed, in Step S1032 do not match any partition pattern, the controller 31 only needs to return from Step S1052 to S1031 to retry it.

This does not force the user to capture an image of the entire screen of the display device 3.

Subsequently, the controller 31 obtains a display device ID in Step S1054. There are various possible ways of obtaining the display device ID.

FIG. 7 shows communications between the user terminal 5 and the display device 3. For example, the user terminal 5 sends an identification information request via near field communication, and the display device 3 sends its display device ID to the user terminal 5. In this way, the controller 31 can obtain information identifying the display device 3, which is currently being processed, via near field communication between both devices.

There is a way that does not use near field communication. For example, the controller 31 checks the current location information (latitude and longitude) detected by the location detector 38. The controller 31 then compares the current location information with information about the installation location of each display device 3, which is stored in the storage unit 35, to identify the display device 3. The controller 31 then obtains the display device ID of the display device 3 from the basic information stored in the storage unit 35.

If the identified layout ID corresponds one-to-one to the display device 3, its display device ID can be confirmed from the information prestored in the storage unit 35.

The following way is also possible. The controller 31 sends the current location information to the information server 2. The information server 2 identifies a display device 3 installed near the received current location information, and then sends the display device ID of the display device 3 to the user terminal 5.

In these ways, the controller 31 identifies the display device 3 of interest in some way.

The display device ID may be obtained, for example, when the user approaches a certain display device 3. For example, it is possible that the application program is launched in Step S101 of FIG. 7 when a nearby display device 3 is identified by a way that uses the current location information and near field communication.

Alternatively, when an image starts to be captured in Step S103, the display device 3 may be identified by a way that uses the current location information and near field communication.

Subsequently, in Step S106 of FIG. 7, the controller 31 performs a selection operation recognition process for recognizing a selected area on which the user has performed a selection operation, among a plurality of areas demarcated by the partition pattern detected on the captured image.

Specifically, the controller 31 detects a selection operation in Step S1061 of FIG. 8. During the period until the user performs a selection operation, the controller 31 returns from Step S1062 to S1061 to wait for the operation.

When detecting a selection operation performed by the user, the controller 31 causes the process to Step S1063 and obtains a section ID. The section ID obtains, from the basic information stored in the storage unit 35, the section ID of an area selected by the user from among the areas 11 in the identified layout ID.

The user can perform a selection operation in various ways.

Figure 9A:
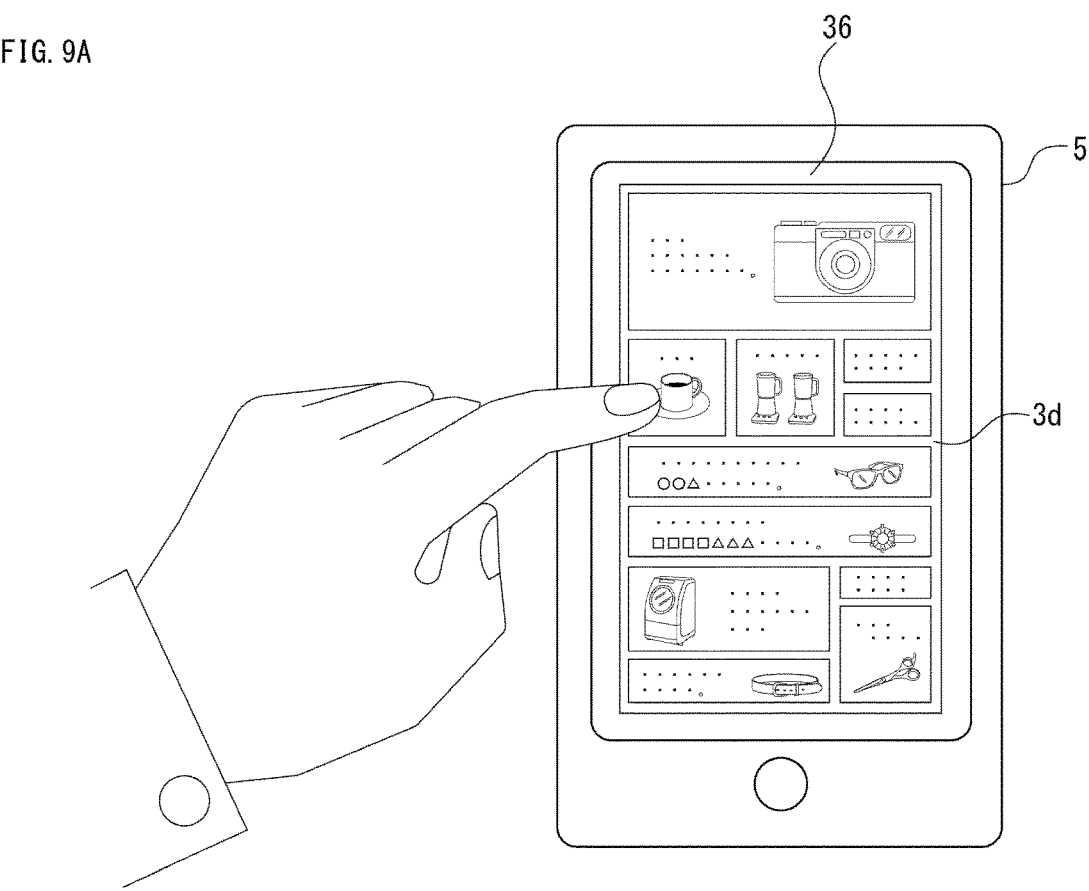
FIGS. 9A and 9B are diagrams each illustrating how a selection operation according to the embodiment is performed.

As shown in FIG. 9A, the user terminal 5 displays the captured image on its screen of the display unit 36. Thus, the user can perform a selection operation by touching the display unit 36 or by moving a cursor using a predetermined operation.

The captured image displayed on the display unit 36 exactly shows items displayed in the areas 11 of the display device 3. Thus, the user only has to select an area showing an image of interest to him or her. Such a selection made on the user terminal 5 is not a touch of a certain area 11 on the display device 3 installed in a public place, thus preventing what the user has selected from becoming known to those around him or her.

Figure 9B:
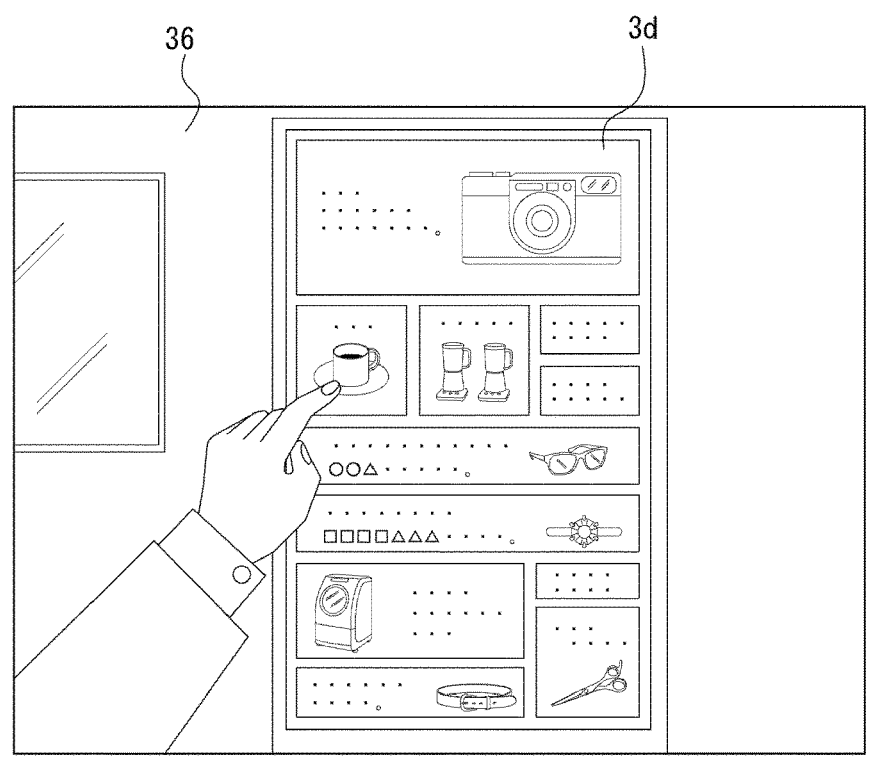

A selection operation may be detected by image recognition. The user is usually a certain distance (e.g., about one to three meters) away from the display device 3. For a user who wears a glasses-type or head-mounted user terminal 5 capable of capturing images in the line-of-sight direction, for example, the user makes such a gesture as indicates a certain item displayed on the display device 3 at a short distance away, and the controller 31 recognizes it. For example, assumes that FIG. 9B is an image of a user's line-of-sight direction captured by a glasses-type user terminal 5. When the user points at a certain area 11, the controller 31 recognizes an image of the user's fingertip and detects the area 11 of the display device 3 pointed at with the fingertip. A selection operation performed by the user may be recognized using such image processing.

Such a gesture with which the user points at something at a short distance away also makes it difficult for those around him or her to know what the user has selected.

After recognizing a user operation in the above way, the controller 31 sends an information retrieval request to the information server 2 in Step S107 of FIG. 7.

As shown in Step S107 of FIG. 8, this information retrieval request includes the display device ID obtained in Step S1054, the layout ID obtained in Step S1053, the section ID obtained in Step S1063, and a time stamp set in Step S1033.

The information server 2, which has received the information retrieval request from the user terminal 5, performs Steps S302, S303, and S304 of FIG. 7.

First, the information server 2 determines what is displayed in the selected area in Step S302. The above information retrieval request allows the information server 2 to identify the display device 3 (display device ID), the area layout (layout ID), and the date and time (time stamp), and also to obtain information about the area 11 selected by the user as the section ID.

By referring to the display device management DB 51 based on the display device ID, the information server 2 can identify the schedule number specifying what the display device was displaying at the date and time.

By referring to the schedule DB 52, the information server 2 can also identify the information item (e.g., advertisement content or news) that was being displayed in the area identified by the section ID at the time.

In the above manner, the information server 2 can understand the display item selected by the user.

Subsequently, the information server 2 identifies related information corresponding to what is displayed in the selected area. For example, the information server 2 obtains the information retrieval data stored in association with the selected schedule data in the schedule DB 52. For example, the information server 2 obtains the URL of a web page to be the related information. Alternatively, the information server 2 may obtain actual related information content itself.

The information server 2 then sends the URL for providing the user terminal 5 with the related information or content as the actual related information to the user terminal 5 in Step S304.

Examples of the related information content include additional information about an advertisement displayed in the area 11, such as text, an image, a moving image, and sound data.

The user terminal 5 obtains information sent from the information server 2 and performs an information output control based on the obtained information in Step S108. Output of information is execution control of display output of the information and output of the information to a storage medium (i.e., storage of the information). Of course, the information can be audibly output.

For example, when a URL is sent from the information server 2, the controller 31 launches a web browser and causes the web browser to display images of the web page specified by the URL on the display unit 36.

Alternatively, when content itself as the related information is sent from the information server 2, the controller 31 causes the related information content to be displayed on the display unit 36 or to be stored in the storage unit 35. The related information can be displayed on the display unit 36 so that text, a still image, a moving image, or the like is displayed in a popup view on the screen as with what is called augmented reality (AR). For example, the related information is displayed over the screen of the display device 3 displayed on the screen of the user terminal 5 shown in FIG. 9A.

Through the above process, the user can not only learn information displayed on the display device 3 by the digital signage system but also obtain more detailed information related to an item of interest displayed on the display device 3.

For example, when an advertisement for a coffee shop is displayed in a certain area 11 of the display device 3, the user captures an image of the display device 3 and performs an operation to select the advertisement on the user terminal 5. Then, the information server 2 sends the URL of a home page for the coffee shop, and thus the user can learn detailed information about the coffee shop by viewing the home page with the user terminal 5.

Alternatively, if the information server 2 sends related information content such as a coupon and a menu for the coffee shop, the user terminal 5 displays it to allow the user to use it.

5. Summary and Modifications

The above embodiment produces the following various effects, and there are various possible modifications to the embodiment.

The user terminal 5 (information processing device) according to the embodiment includes the captured image receiver 41, the partition pattern extractor 42, and the object recognizer 43. The captured image receiver 41 receives input of a captured image. The partition pattern extractor 42 extracts a partition pattern that demarcates a plurality of areas in the captured image received by the captured image receiver 41. By referring to the storage unit 35 that prestores one or more partition patterns in association with objects to be processed, the object recognizer 43 recognizes an object to be processed corresponding to the partition pattern extracted from the captured image.

By extracting a partition pattern on the captured image and then comparing this with the stored partition patterns (area layouts), an object to be processed that is included in the captured image can be identified without analyzing a feature value such as the entire context of a captured object. Consequently, when a wide variety of images are displayed in the areas in the captured image, an object to be processed can be recognized without performing a relatively high-processing-load image analysis of a still image, a moving image, or the like.

The user terminal 5 further includes a selection operation recognizer 44, a request sender 45, and an information output controller 46. The selection operation recognizer 44 recognizes a selected area on which a selection operation has been performed, among a plurality of areas demarcated by a partition pattern, in the object to be processed that is identified by the object recognizer 43. The request sender 45 sends an information retrieval request to an external device (the information server 2). The information retrieval request includes at least selection operation information indicating the selected area recognized by the selection operation recognizer 44. The information output controller 46 obtains information sent in response to the information retrieval request and performs an information output control based on the obtained information.

That is, when a certain area 11 is selected by a user operation in each area 11 of an image of the recognized object to be processed, the user terminal 5 sends an information retrieval request with a section ID indicating the selected area to the information server 2. This enables the information server 2 to recognize that the user terminal 5 is requesting information related to what is displayed in the selected area.

To recognize the area 11 selected by the user is to indirectly recognize a display item of interest to the user. Therefore, the selection operation information indicating the area 11 selected by the user indicates the display item of interest to the user. This enables the external device, such as the information server 2, to determine what information the user desires to obtain.

That is, the external device can determine which of the display items the user is interested in without directly analyzing the display items by advanced image processing.

An image of the display device 3 to be processed in the embodiment is an image in which a display item is managed in association with each of a plurality of areas demarcated by a partition pattern in advance. The information retrieval request from the user terminal 5 is for requesting retrieval of related information about a display item associated with an area indicated by selection operation information.

That is, the display device 3 to be processed has a plurality of areas 11 demarcated by a predetermined partition pattern and is displaying various types of information. The information server 2, which manages display items in association with the areas in advance using the display device management DB 51 and the schedule DB 52, can understand a display item on the basis of the information retrieval request including the selection operation information, and directly or indirectly provide information related to the display item. That is, the information server 2 can determine the display item of interest to the user on the basis of area selection operation information, and thus can provide information related to the display item of interest to the user (related information content) or information (e.g., a URL) for accessing the related information.

Thus, by specifying a display of interest from among a plurality of items displayed in the public digital signage using his or her user terminal 5 as shown in the embodiment, the user can obtain information related to the display of interest.

The user can select desired information and view its related information while preventing which information the user is interested in from becoming known to those around him or her.

For the information server 2, which provides information (e.g., image content) to be presented in each area 11, the need to learn the content of every new information assigned for display and its related information content can be eliminated.

The image of the display device 3 to be processed is an image in which a display item is managed in association with time information for each of a plurality of areas demarcated by a partition pattern. The timing information is managed in schedule DB 52.

The request sender 45 of the user terminal 5 sends, to the information server 2, the information retrieval request including date and time information (S1033: time stamp) at which the captured image receiver 41 received input of the captured image.

When causing the display item in each area 11 to change as time passes, the information server 2, which manages display items in association with the areas and timing information in advance, can understand an display item being displayed at the date and time when the user performed the operation, on the basis of the information retrieval request including area selection operation information and the date and time information, and directly or indirectly provide information related to the display item.

This management enables the information server 2 to cause a different advertisement to be displayed at a different time and to provide related information corresponding to the displayed advertisement.

Even if the user captures a still or moving image of the display device 3 and then performs a selection operation on a captured display item after a while, the information server 2 can provide information related to the display item captured at that time.

The timing information may be the length of time elapsed from a certain starting point or may be time.

The partition pattern can be predetermined to partition an area by straight lines. That is, the partition pattern extractor extracts a partition pattern partitioned by straight lines in the captured image.

A partition pattern is easy to computationally recognize on the assumption that the partition pattern is partitioned by straight lines. Thus, the processing load placed by recognizing the partition pattern is reduced.

Alternative, there is a possible example of using a partition pattern including curved lines as an area layout.

An image to be processed by the partition pattern extractor 42 is an image of the display device 3 on which images are displayed in all or some of a plurality of areas demarcated by a partition pattern. The images displayed on the display device 3 include a moving image. Alternatively, all of the items displayed in the areas 11 may be moving images.

Conventional image recognition for moving images performs a highly computationally-intensive process that includes obtaining feature values of all frames of a changing screen in advance, calculating a feature value of each frame of a captured image changing in real time, and comparing both series of feature values. In contrast, in this embodiment, the partition pattern extractor 42 recognizes the lines of the frame 10 having a fixed partition pattern, and thus can identify what is displayed in the flame 10. That is, for a digital signage system that displays a moving image, a partition pattern is extracted as in this embodiment, and a display item can be recognized in response to a selection operation. Consequently, the processing load can be greatly reduced.

When a still image is displayed in an area of the display device 3, it is possible that the still image includes something confusable with lines indicating a partition (frame 10) in a partition pattern. This may cause a false recognition when the partition pattern is extracted. In this embodiment, such a false recognition can be prevented by comparing the extracted partition pattern with the partition patterns of area layouts in the stored basic information. For example, even if the extracted partition pattern includes a line segment that is not in the partition patterns of the stored area layouts, it is possible that these partition patterns match. That is, even if the extracted partition pattern is not perfectly identical to the one partition pattern, these partition patterns are determined to match at least if all line segments forming the partition pattern of the corresponding area layout are included in the extracted partition pattern. This can prevent a false recognition that the partition patterns do not match, even when an image part confusable with the frame 10 is extracted from the captured image.

The present invention is not limited to the examples of the embodiment. There are various possible modifications.

In the embodiment, the digital signage system is taken as an example. Alternatively, for example, there is a possible system targeted at printed posters in place of the display device 3. That is, when a poster shows various items in areas demarcated by a frame, the user terminal 5 captures an image of the poster, recognizes a partition pattern based on the frame, compares it, and recognizes an object to be processed. This enables the information server 2 to send an information retrieval request in response to a user operation. Thus, the information server 2 can provide corresponding relational information.

In the embodiment, a display device ID, a layout ID, a section ID, and a time stamp are sent as an information retrieval request. However, the information retrieval request need not include all of these.

For example, the time stamp is unnecessary when the content of information disseminated in a public place stays unchanged (i.e., when related information to be retrieved remains unchanged), such as when the display device 3 always displays the same still image, moving image, or text as the same information item in each area 11, and when a poster image is displayed.

For such a system as shown in FIG. 1B, in which the information server 2 corresponds one-to-one with the display device 3, the display device ID is unnecessary.

Moreover, even when there are many display devices 3 for one information server 2, the layout ID is unnecessary if each display device uses the same area layout.

Also, when display devices 3 correspond one-to-one to layout IDs, that is, when for each display device 3 is uniquely assigned a fixed layout, at least either the display device ID or the layout ID needs to be used.

Also for example, when each area 11 of all area layouts is assigned a unique section, the display device and the layout ID are unnecessary because the corresponding display device and area layout can be understood based on only the section ID.

Thus, the user terminal 5 needs to send, to the information server 2, an information retrieval request that includes at least the section ID indicating an area selected by the user, the other information is required depending on the system configuration.

It is possible that Steps S301 and S302, which FIG. 7 shows as steps performed by the information server 2, may be performed by the user terminal 5.

For example, the information server 2 sends the display device management DB 51 and the schedule DB 52 as update data to the user terminal 5 in Step S301. Depending on the application program for the user terminal 5, the user terminal 5 can determine what is displayed in an area selected by the user who has performed a selection operation and obtain a URL as related information, by referring to the display device management DB 51 and the schedule DB 52 instead of communicating with the information server. Consequently, display or the like of the related information in Step S108 can be performed.

6. Program and Storage Medium

A program according to an embodiment of the present invention is a program for causing an information processing device (e.g., a CPU), such as a controller 31 of the user terminal 5, to perform the process of each function shown in FIG. 4B.

The program according to the embodiment causes the information processing device to perform the step of receiving input of a captured image (S103), the step of extracting a partition pattern that demarcates a plurality of areas in the captured image received in S103 (S104), and the step of recognizing an object to be processed corresponding to the partition pattern extracted from the captured image by referring to a storage unit that prestores one or more partition patterns in association with objects to be processed (S105).

Alternatively, the program may cause the information processing device to perform a step of recognizing a selected area on which a selection operation has been performed, among a plurality of areas demarcated by a partition pattern, in the object to be processed that is identified in S105 (S106), a step of sending, to an external device (e.g., the information server 2), an information retrieval request including at least selection operation information (e.g., a section ID) indicating the selected area recognized in S106 (S107), and a step of obtaining information sent in response to the information retrieval request and of performing an information output control based on the obtained information (S108).

That is, this program is a program for causing the information processing device to perform the process performed by the terminal 5, which is described with reference to FIGS. 7 and 8.

This program can achieve the information processing device as the above-described user terminal 5. For example, the application program installed on the user terminal 5 is the program according to the embodiment.

Such a program can be prestored, for example, in a HDD as a storage medium built in a computer device or in a ROM in a microcomputer including a CPU. Alternatively, the program can be temporarily or permanently stored (recorded) in a removable storage medium, such as a semiconductor memory, a memory card, an optical disk, a magneto-optical disk, or a magnetic disk. Such a removable storage medium can be provided as what is called package software.

The program can not only be installed from the removable storage medium, for example, onto a personal computer, but can also be downloaded from a download site over a network, such as a LAN and the Internet.

REFERENCE SIGNS LIST 1 network, 2 information server, 3 display device, 4 DB section, 5 user terminal, 31 controller, 32 imaging unit, 33 image processor, 34 communication unit, 35 storage unit, 36 display unit, 37 input unit, 38 location detector, 39 audio output unit, 40 basic information obtainer, 41 captured image receiver, 42 partition pattern extractor, 43 object recognizer, 44 selection operation recognizer, 45 request sender, 46 information output controller

The invention claimed is:

1. An information processing device comprising:
at least one memory configured to store computer program code;
at least one processor configured to access said computer program code and operate as instructed by said computer program code, said computer program code including:
captured image receiving code configured to receive a captured image:
partition pattern extractor code configured to cause at least one of said at least one processor to extract a partition pattern from the captured image received by the captured image receiving code, the partition pattern demarcating an area into a plurality of sections;
object recognizer code configured to cause at least one of said at least one processor to recognize an object to be processed corresponding to the partition pattern extracted from the captured image by accessing a storage prestoring one or more partition patterns in association with objects to be processed;
selection operation recognizer code configured to cause at least one of said at least one processor to recognize a selected section on which a selection operation has been performed, among the plurality of sections demarcated by the partition pattern, in the object to be processed identified by the object recognizer code;
request sender code configured to cause at least one of said at least one processor to send an information retrieval request to an external device, the information retrieval request including selection operation information indicating the selected section recognized by the selection operation recognizer code; and
information output controller code configured to cause at least one of said at least one processor to obtain information sent in response to the information retrieval request and to perform an information output control based on the obtained information,
wherein an image of the object to be processed is an image in which a display item is managed in association with time information for each of the plurality of sections demarcated by the partition pattern, and
wherein the request sender code is configured to cause at least one of said at least one processor to send the information retrieval request including date and the time information at which the captured image receiving code received the captured image.

2. The information processing device according to claim 1, wherein
the image of the object to be processed is an image in which a display item is managed in association with each of the plurality of sections demarcated by the partition pattern in advance, and
wherein the information retrieval request is for requesting retrieval of related information about the display item associated with one of the plurality of sections indicated by selection operation information.

3. The information processing device according to claim 1, wherein
the partition pattern extractor code is configured to cause at least one of said at least one processor to extract the partition pattern partitioned by straight lines in the captured image.

4. The information processing device according to claim 1, wherein
the image to be processed by the partition pattern extractor code is an image of a display device on which images are displayed in all or some of the plurality of sections demarcated by the partition pattern, and the images displayed on the display device include a moving image.

5. The information processing device according to claim 1, wherein
the partition pattern extractor code is configured to cause at least one of said at least one processor to extract the partition pattern partitioned by curved lines in the captured image.

6. The information processing device according to claim 1, wherein the storage stores schedule information comprising the time information and a layout ID associated with each of a plurality of partition patterns extracted from a plurality of captured images.

7. The information processing device according to claim 1, wherein the storage stores installation location information comprising a latitude and longitude of a place where a display device is installed, an address of the place, and a facility type.

8. An information processing method comprising:
receiving a captured image;
extracting a partition pattern from the received captured image, the partition pattern demarcating an area into a plurality of sections;
recognizing an object to be processed corresponding to the partition pattern extracted from the captured image by accessing a storage prestoring one or more partition patterns in association with objects to be processed;
recognizing a selected section on which a selection operation has been performed, among the plurality of sections demarcated by the partition pattern;
sending an information retrieval request to an external device, the information retrieval request including selection operation information indicating the selected section recognized by the recognizing the selected section on which the selection operation has been performed;
obtaining information sent in response to the information retrieval request and performing an information output control based on the obtained information,
wherein an image of the object to be processed is an image in which a display item is managed in association with time information for each of the plurality of sections demarcated by the partition pattern, and
wherein the information retrieval request includes date and the time information at which the captured image is received.

9. A non-transitory computer readable recording medium having stored thereon a computer program configured to cause an information processing device to:
receive a captured image;
extract a partition pattern from the received captured image, the partition pattern demarcating an area into a plurality of sections;
recognize an object to be processed corresponding to the partition pattern extracted from the captured image by accessing a storage prestoring one or more partition patterns in association with objects to be processed;
recognize a selected section on which a selection operation has been performed, among the plurality of sections demarcated by the partition pattern;
send an information retrieval request to an external device, the information retrieval request including selection operation information indicating the selected section recognized by the recognizing the selected section on which the selection operation has been performed;
obtain information sent in response to the information retrieval request and perform an information output control based on the obtained information,
wherein an image of the object to be processed is an image in which a display item is managed in association with time information for each of the plurality of sections demarcated by the partition pattern, and
wherein the information retrieval request includes date and the time information at which the captured image is received.

* * * * *